United States Patent
Kim et al.

(10) Patent No.: US 9,064,137 B2
(45) Date of Patent: Jun. 23, 2015

(54) COUNTERFEIT PROTECTION AND VERIFICATION SYSTEM AND METHOD

(71) Applicant: Fenwal, Inc., Lake Zurich, IL (US)

(72) Inventors: Kwang Suk Kim, Palatine, IL (US); Terry Chung, Kildeer, IL (US)

(73) Assignee: Fenwal, Inc., Lake Zurich, IL (US)

( * ) Notice: Subject to any disclaimer, the term of this patent is extended or adjusted under 35 U.S.C. 154(b) by 16 days.

(21) Appl. No.: 13/790,577

(22) Filed: Mar. 8, 2013

(65) Prior Publication Data

US 2014/0252078 A1  Sep. 11, 2014

(51) Int. Cl.
| | |
|---|---|
| *G06F 17/00* | (2006.01) |
| *G06K 7/08* | (2006.01) |
| *G06K 19/06* | (2006.01) |
| *G06K 5/00* | (2006.01) |
| *G06K 1/12* | (2006.01) |
| *B04B 5/04* | (2006.01) |
| *G06K 19/12* | (2006.01) |
| *G07C 9/00* | (2006.01) |
| *B04B 7/06* | (2006.01) |

(52) U.S. Cl.
CPC *G06K 5/00* (2013.01); *G06K 1/125* (2013.01); *G06K 19/06187* (2013.01); *B04B 5/0442* (2013.01); *G06K 7/087* (2013.01); *G06K 7/088* (2013.01); *G06K 19/12* (2013.01); *G07C 9/0073* (2013.01); *B04B 7/06* (2013.01)

(58) Field of Classification Search
CPC .......... A61M 2205/6072; G06K 1/125; G06K 19/12; G06K 19/06187
USPC .......................... 235/375, 449, 493
See application file for complete search history.

(56) References Cited

U.S. PATENT DOCUMENTS

| | | | |
|---|---|---|---|
| 3,788,617 A * | 1/1974 | Barney .......................... | 235/493 |
| 4,511,616 A | 4/1985 | Pitts et al. | |
| 4,585,930 A | 4/1986 | Casden | |
| 4,855,583 A * | 8/1989 | Fraser et al. ................... | 235/492 |
| 4,857,828 A | 8/1989 | Celine | |
| 5,868,696 A | 2/1999 | Giesler et al. | |
| 5,965,214 A * | 10/1999 | Crossfield et al. ............. | 427/547 |
| 2005/0242956 A1* | 11/2005 | Sorkine ....................... | 340/572.6 |
| 2006/0282168 A1* | 12/2006 | Sherman et al. ........... | 623/18.12 |

(Continued)

FOREIGN PATENT DOCUMENTS

| | | | | |
|---|---|---|---|---|
| GB | 2 263 068 A | 7/1993 | | |
| WO | WO 8002376 A1 * | 11/1980 | .............. | A61M 5/00 |
| WO | WO 03/081379 A2 | 10/2003 | | |

OTHER PUBLICATIONS

European Search report (mailed Jun. 22, 2014) for application No. 13187874.06-1806, Applicant: Fenwal, Inc.

*Primary Examiner* — Steven S Paik
*Assistant Examiner* — Claude J Brown
(74) *Attorney, Agent, or Firm* — Cook Alex Ltd.

(57) ABSTRACT

A system is provided comprising first and second parts that are brought together for each occasion the system is used. The first part comprises a label having a plurality of discrete magnetic portions arranged in a predetermined pattern unique to the first part, and the second part comprises a magnetic reader for identifying the magnetic pattern on the first part and generating a signal indicative of the pattern. The second part also includes a programmable controller configured to receive signals from the reader to confirm the identity of the first part and permit further operation of the system upon a positive identification of the first part.

20 Claims, 4 Drawing Sheets

(56) References Cited

U.S. PATENT DOCUMENTS

| | | | |
|---|---|---|---|
| 2008/0019003 A1* | 1/2008 | Phillips et al. | 359/582 |
| 2008/0185419 A1* | 8/2008 | Smith et al. | 227/179.1 |
| 2009/0012442 A9* | 1/2009 | Brugger et al. | 604/4.01 |
| 2009/0123780 A1* | 5/2009 | Ingvert | 428/827 |
| 2009/0209979 A1* | 8/2009 | Yates et al. | 606/143 |
| 2010/0282834 A1* | 11/2010 | Devergne et al. | 235/375 |
| 2011/0118694 A1* | 5/2011 | Yodfat et al. | 604/500 |
| 2011/0232358 A1* | 9/2011 | Artsyukhovich et al. | 73/1.16 |
| 2012/0181331 A1* | 7/2012 | Beden et al. | 235/375 |
| 2013/0253465 A1* | 9/2013 | Holtwick et al. | 604/411 |
| 2014/0057771 A1* | 2/2014 | Case et al. | 494/10 |

\* cited by examiner

COUNTERFEIT PROTECTION AND VERIFICATION SYSTEM AND METHOD

BACKGROUND

The present disclosure relates to a system and method for ensuring that only genuine authorized and suitable components are used in a system comprising two components and, more particularly, to such a system and method in the context of a device for performing a medical procedure comprising a single use disposable component and a durable, reusable hardware component.

Many systems in use include one or more disposable or replaceable components in combination with a durable reusable component. Oftentimes, the use of a genuine or authorized disposable or replaceable component is critical to the safe and proper functioning of the system. This is especially true in the context of devices for performing medical processes and procedures in order to protect both the patient and system operator from potentially hazardous biomaterials. Indeed, single-use disposable devices and components are ubiquitous in the medical field, and quality control to insure proper manufacture and traceability is crucial. Thus, there is a compelling need to insure that components intended for a single use are, in fact, authentic and suitable for use with the durable hardware component for performing the desired procedure.

SUMMARY

The present subject matter has a number of aspects which may be used in various combinations, and a disclosure of one or more specific embodiments is for the purpose of disclosure and description, and not limitation. This summary highlights only a few of the aspects of this subject matter, and additional aspects are disclosed in the drawings and the more detailed description that follows.

In accordance with one aspect of the present disclosure, a system comprising first and second parts that are brought together for each occasion the system is used is provided in which the first part comprises a label having a plurality of discrete magnetic portions arranged in a predetermined pattern unique to the first part, and the second part comprises a magnetic reader for identifying the magnetic pattern on the first part and generating a signal indicative of the pattern, and a programmable controller configured to receive signals from the reader to confirm the identity of the first part and permit further operation of the system upon a positive identification of the first part.

In accordance with another aspect, the first part of the system comprises a single-use disposable component and the second part comprises a durable reusable hardware component, in which the disposable component is associated with the hardware component to perform a medical procedure.

In accordance with a further aspect, the first part of the system further comprises packaging for the single-use disposable component, and the label is associated with one of the packaging and the disposable component.

In accordance with another aspect, the label associated with the disposable component comprises a grid with the magnetic portions associated with selected areas of the grid arranged to uniquely identify the first part, and the reader comprises a matching grid having a sensor associated with each area of the grid.

In accordance with a further aspect, the label may be formed separately from the disposable component and affixed thereto, or the label may be formed directly on the disposable component.

In accordance with another aspect, the packaging for the disposable component comprises a tray configured to nest in a predetermined orientation on the durable reusable hardware component during mounting of the disposable component on the hardware component, the predetermined orientation aligning the grids on the label and the reader.

In accordance with a further aspect the sensors for the reader may comprise magnetic switches activated by proximity to a magnetic field. Additionally, the magnetic portions of the label may comprise magnetic ink.

In accordance with another aspect, the label may be associated with the disposable component so as to be obscured from sight. Similarly, the reader may be associated with the reader so as to be obscured from sight.

In accordance with another aspect of the disclosure, a method is provided for verifying that the first part of the system may be properly used with the second part of the system in which the first part is brought into proximity with the second part so that the magnetic reader can read the magnetic portions on the label associated with the first part. The reader then sends a signal to the controller corresponding to the pattern on the label, and the controller then determines whether the pattern corresponds to that of an authentic first part. The controller then permits further operation of the system only upon confirmation that the first part is authentic. In accordance with another aspect of the method, an operator is required to input to the controller identification of a selected procedure to be performed to confirm the suitability of the first part for performing the selected procedure. Then, further operation of the system is permitted only upon the controller confirming that the first part is capable of performing the selected procedure.

BRIEF DESCRIPTION OF THE DRAWINGS

These and other aspects of the present subject matter are described in the following detailed description and shown in the attached figures, in which.

DETAILED DESCRIPTION OF THE EMBODIMENTS

A more detailed description of the systems and methods in accordance with the present disclosure is set forth below. It should be understood that the description below of specific devices and methods is intended to be exemplary, and not exhaustive of all possible variations or applications. Thus, the scope of the disclosure is not intended to be limiting, and should be understood to encompass variations or embodiments that would occur to persons of ordinary skill.

Figure 1:
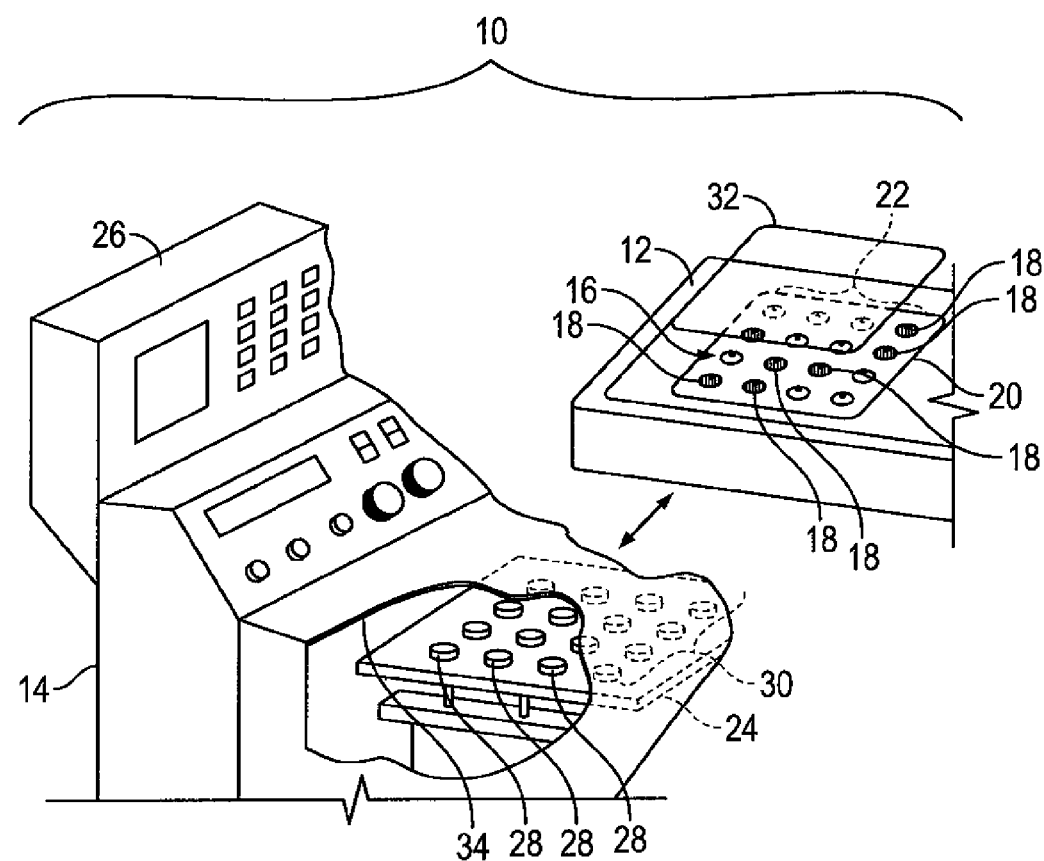
FIG. 1 is a schematic exploded view of a representative two-part system showing the verification system and method of the present disclosure.

Turning to FIG. 1, there is seen a system, generally indicated 10, comprising a first replaceable or single-use part 12 and a second durable or reusable part 14. In accordance with one aspect of the disclosure, the first part 12 includes an identification element, such as, but not limited to, a label 16 that includes a plurality of discrete magnetic portions 18 arranged in a predetermined sequence or pattern that uniquely identifies the first part 12 as being a genuine component intended for use in combination with the second part 14 to form the system 10. As used herein, "label" is broadly construed to include the magnetic portions 18 being part of, or formed integrally with, the first part 12, or formed on a separate substrate 20 that is affixed (e.g., by adhesive) to the first part.

In a non-limiting example, the label 16 may comprise a grid 22 with magnetic portions 18 associated with selected spaces on the grid, while other spaces on the grid are "blank". As shown in FIG. 1, the grid 22 has a square configuration, with four rows and four columns. However, the grid 22 may take any configuration that has discrete locations with which the magnetic portions 18 may be selectively associated to form the predetermined pattern that uniquely identifies the first part 12 to confirm that it is genuine.

The second part 14 of the system 10 comprises a magnetic reader, generally designated 24, that is configured to identify the pattern of the magnetic portions 18 forming the label 16 on the first part 12, and then generate a signal indicative of the pattern on the label. The second part 14 includes a programmable controller 26 configured to receive the signals from the magnetic reader and identify the first part 12 as either genuine or counterfeit. The controller 24 permits further operation of the system 10 only upon identifying the first part 12 as genuine.

Referring again to FIG. 1, the reader 24 comprises a series of magnetic switches 28 (such as Hall effect sensors) arranged in a grid 30 matching the grid 22 on the label 16. The magnetic switches 28 are activated when the grid 22 on the first part 12 is brought into proximity and alignment with the grid 30 on the reader 24. To this end, the first part 12 may be configured to nest on the second part 14, such that the label 16 is brought into the proper position relative to the reader 24 for the magnetic portions 18 on the label 16 to activate the corresponding switches/sensors 28 of the reader 24.

By way of example, the magnetic portions 18 may comprise pole magnets, with the poles having various orientations, and/or the magnetic portions 18 may be of different strengths, to add complexity to the pattern and, thus, security to the system. Further, the magnetic portions 18 may comprise magnetic ink, and may be either printed directly on the first part 12, or printed on the substrate 20 that is affixed to the first part 12. Further, the patterns of magnetic portions can be changed periodically, and the controller 24 reprogrammed accordingly, to further enhance security.

The achievement purposes of the verification system of the present disclosure may be additionally facilitated if the presence of the system is not readily apparent, so that a potential counterfeiter would not be aware and try to defeat the system. To this end, the label 16 and/or reader 22 may be obscured from view. In the case of the label 16, this may be achieved by an additional sheet 32 of an opaque material affixed to the first part 12 so as to overlay the label 16. In the case of the magnetic reader 22, this may be achieved by mounting the reader 22 inside the housing 34 of the second part 14.

While the verification system described above may be used in any system having single-use or replaceable parts, it may find particular applicability in systems for performing medical procedures in which the systems include a single-use disposable component and a durable reusable hardware component. In such a use, the pattern of magnetic portions on the disposable component can additionally provide information, such as the procedure for which the disposable component is to be used, lot number, expiration date, etc.

Further, the controller may be programmed so that, after confirming that the disposable component is genuine, the operator is required to input an identification of the specific procedure to be performed to confirm the suitability of the disposable component for performing the procedure and to continue with operation of the system. Once the disposable component is confirmed as genuine and is suitable for performing the desired procedure, the controller may automatically fill the fields for various procedure parameters that would otherwise be manually input by the operator.

Figure 2:
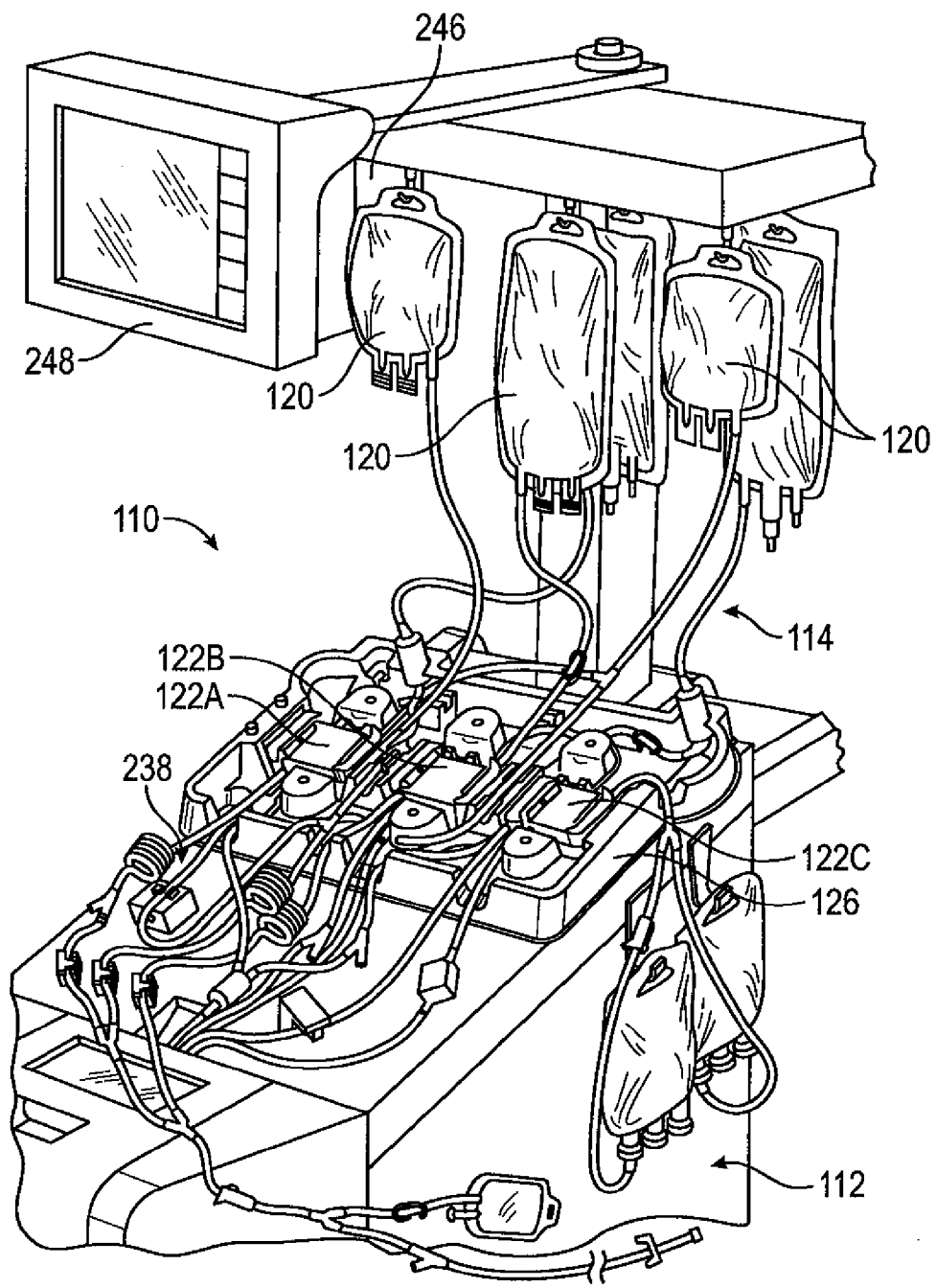
FIG. 2 is a perspective view of a two-part centrifugal processing system in which the system and method of the present disclosure may be advantageously used, the system centrifugal processing system comprising a durable, reusable centrifuge assembly having a single-use, disposable fluid processing assembly associated therewith.
Figure 3:
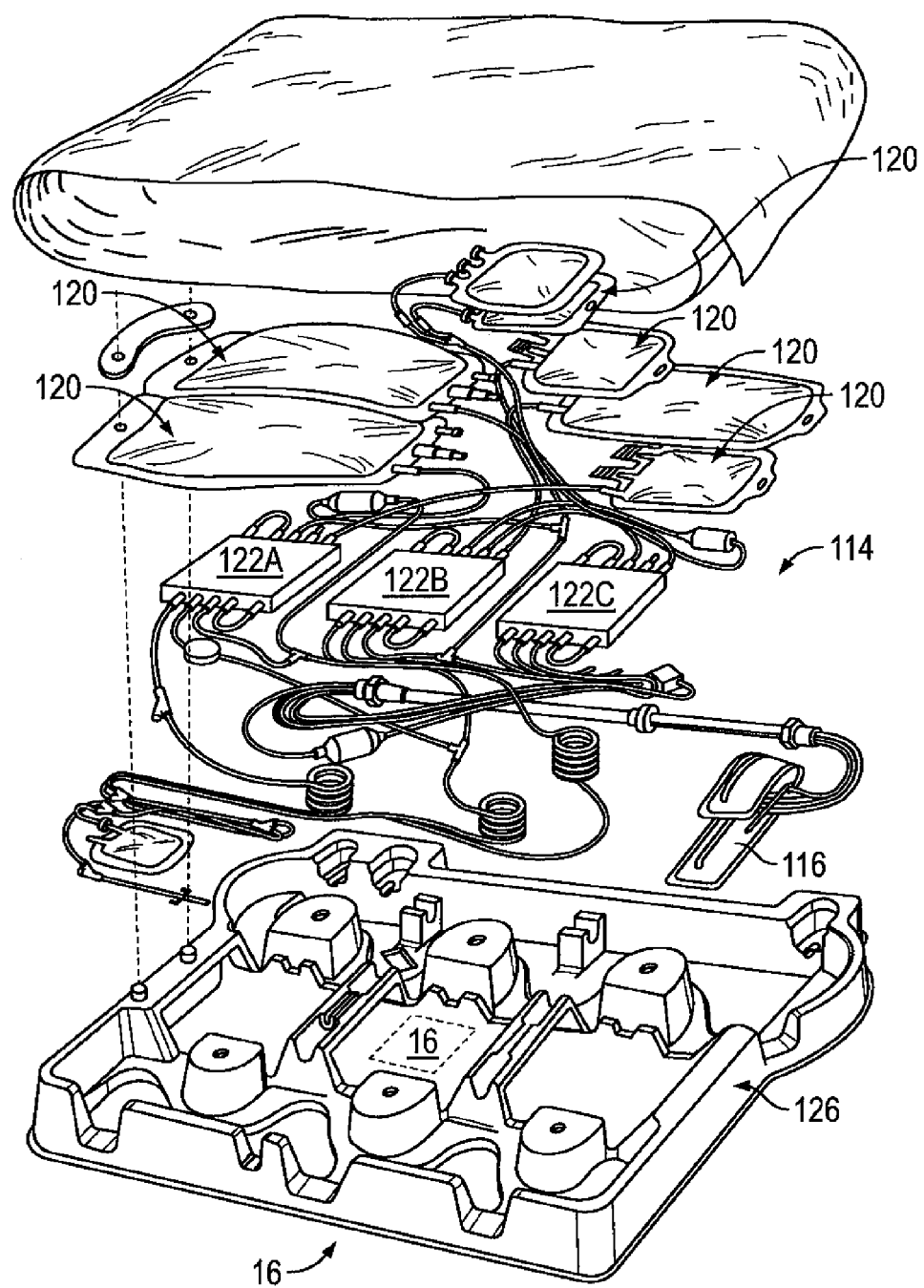
FIG. 3 is an exploded perspective view of the single-use, disposable fluid processing assembly of FIG. 2 in combination with an organizer tray for packaging the kit.
Figure 4:
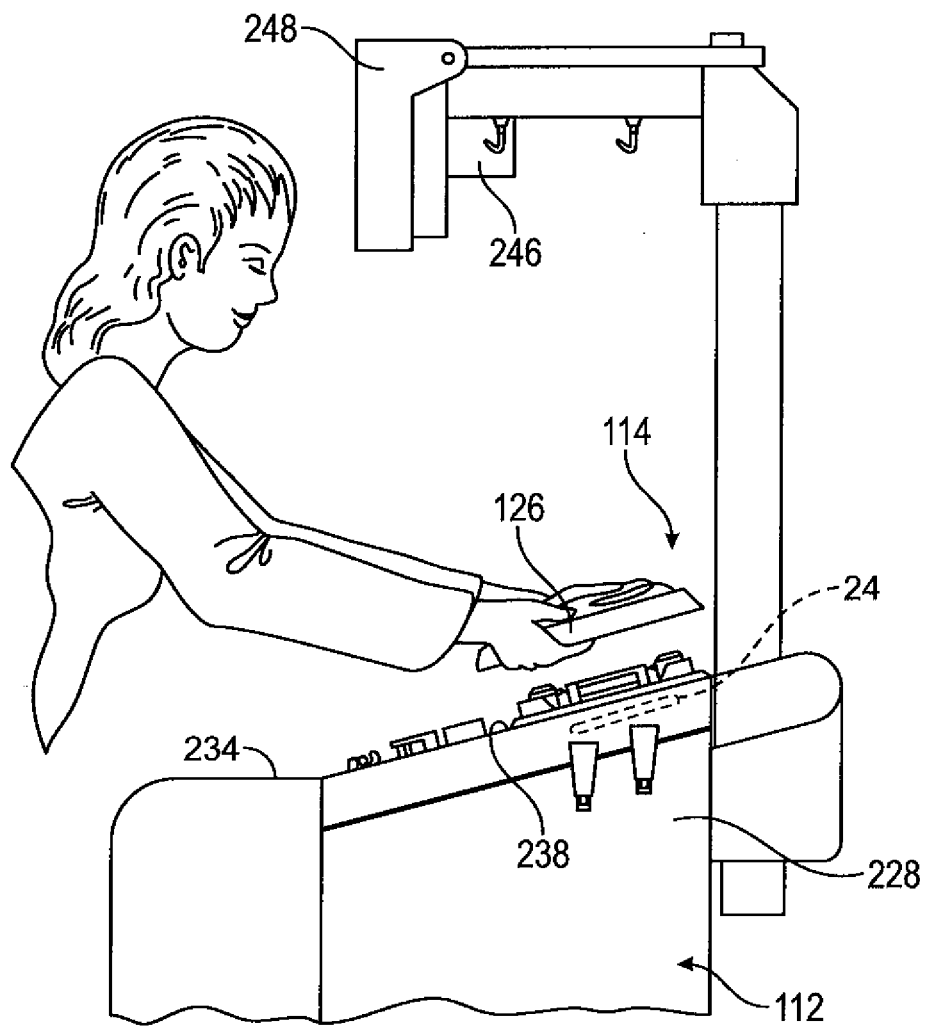
FIG. 4 shows one of the steps by which a user sets up the tray-mounted fluid processing assembly shown in FIG. 3 on the centrifuge assembly shown in FIG. 2.

Turning to FIGS. 2-4, the system and method of the present disclosure will be described in the context of a blood processing system of the type routinely used to perform apheresis, in which whole blood is separated by centrifugation into its various therapeutic components, such as red blood cells, platelets, and plasma. The system 110 is as shown in described in Giesler et al. U.S. Pat. No. 5,868,696, incorporated herein by reference, and in commercially embodied in the Amicus® separator, available from Fenwal, Inc., of Lake Zurich, Ill.

The system 110 includes a centrifuge assembly 112 that is intended to be durable and of long-term use, and a fluid processing assembly 114 that is intended to be a single-use, disposable item loaded on the centrifuge assembly 112 at the time of use (as shown in FIG. 2). The centrifuge assembly 112 includes a programmable processing controller 246, including an integrated input/output terminal 248 that receives and displays information relating to the processing procedure.

The fluid processing assembly 114 includes a processing chamber 116 (best seen in FIG. 3) that is rotated by the centrifuge assembly 112 to centrifugally separate blood components, an array of flexible tubing that forms a fluid circuit 118, containers 120 to dispense and receive liquids during processing, and cassettes 122A, 122B, 122C that serve in association with pump and valve stations on the centrifuge assembly 112 to direct liquid flow.

As seen in FIGS. 2 and 3, the entire processing assembly 114 is packaged for use within an organizer tray 126 that holds the processing chamber 116, the containers 120, the cassettes 122A, 122B, 122C, and fluid circuit 118 in an orderly, compact package before use. The organizer tray 126 is preferably made of vacuum-formed plastic material, and includes four side panels 138 and a bottom panel 140.

As seen in FIG. 2, the organizer tray 126 mounts or nests on the centrifuge assembly 112 during use. In accordance with the present disclosure, the bottom of the organizer tray includes a magnetic label, such as label 16 described above, and the centrifuge assembly 112 includes a magnetic reader, such as the magnetic reader 24 described above, beneath the top panel 238 of the housing 228 on which the tray 126 mounts. Thus, the magnetic portions 18 on the label 16 and the sensors 28 of the reader 24 are automatically brought into proper alignment when the tray 126 is mounted on the centrifuge assembly 112.

Accordingly, with a system as described above, a method for verifying that the first part of the system may be properly used with the second part is provided. With reference to FIG. 4, the operator by first places the organizer tray 126 for the single-use processing assembly 114 onto the top panel 238 of the housing 228 for the centrifuge assembly 112. This brings the label 16 on the tray 126 into proximity with the reader 24 of the centrifuge assembly 112.

The reader 24 then sends a signal corresponding to pattern of the magnetic portions 18 on the label 16 to the controller 246, and the controller 246 determines whether the pattern detected by the reader 24 corresponds to that of a genuine or authentic processing assembly 114. The controller 246 then permits further operation of the system 110 only upon confirming that the processing assembly mounted thereon is genuine.

To provide further safeguards as to performance of the intended procedure, the controller may then require the operator to input an identification of the procedure that is to be performed to confirm that the processing assembly 114 is suitable for performance of that procedure. Further operation of the system 110 would be permitted by the controller 246 only upon confirmation that the processing assembly 114 is that for performing the intended procedure.

Thus, a system and method has been provided for ensuring that only genuine authorized components are used in a system comprising two components and, more particularly, to such a system and method in the context of a device for performing a medical procedure comprising a single use disposable component and a durable, reusable hardware component. While the system and method have been described in connection with certain preferred embodiment, this is for illustrative purposes, and is not intended to indicate limitation of the use of the system and method with any particular type of devices.

The invention claimed is:

1. A system comprising first and second parts that are brought together for each occasion the system is used wherein:
    the first part comprises a label defining a grid having a plurality of discrete portions that are selectively magnetized to provide a predetermined pattern unique to the first part; and
    the second part comprises a magnetic reader for identifying the magnetic pattern on the first part and generating a signal indicative of the pattern, and a programmable controller programmed to recognize the predetermined pattern and configured to receive signals from the reader to confirm the identity of the first part and permit further operation of the system upon a positive identification of the first part and further configured to be reprogrammed to identify a changed predetermined pattern.

2. The system of claim 1 wherein the first part comprises a single-use disposable component and the second part comprises a durable reusable hardware component, the disposable component being associated with the hardware component to perform a medical procedure.

3. The system of claim 2 wherein the first part further comprises packaging for the single-use disposable component and the label is associated with one of the packaging and the disposable component.

4. The system of claim 3 wherein the packaging comprises a tray configured to nest in a predetermined orientation on the durable reusable hardware component during mounting of the disposable component on the hardware component, the predetermined orientation aligning the grid on the label with the reader.

5. The system of claim 4 wherein the single-use disposable component comprises a fluid processing assembly and the durable reusable hardware component comprises a centrifuge assembly.

6. The system of claim 5 wherein the centrifuge assembly comprises one or more pump and valve stations, and the fluid processing assembly comprises a fluid circuit with a processing chamber, one or more containers for dispensing and receiving liquids, and one or more cassettes configured to serve in association with the pump and valve stations to direct liquid flow through the fluid circuit.

7. The system of claim 4 wherein the tray comprises a bottom panel and the label is associated with the bottom panel.

8. The method of claim 7 wherein the first part further comprises a packaging tray for the single-use disposable component, the label being associated with the tray, the method further comprising:
    nesting the tray in a predetermined orientation on the durable reusable hardware component during mounting of the disposable component on the hardware component to align the grid on the label with the reader.

9. The system of claim 2 wherein the single-use disposable component comprises a fluid processing assembly and the durable reusable hardware component comprises a centrifuge assembly.

10. The system of claim 9 wherein the centrifuge assembly comprises one or more pump and valve stations, and the fluid processing assembly comprises a fluid circuit with a processing chamber, one or more containers for dispensing and receiving liquids, and one or more cassettes configured to serve in association with the pump and valve stations to direct liquid flow through the fluid circuit.

11. The system of claim 1 wherein the reader comprises a plurality of sensors arranged in a grid matching the grid on the label.

12. The system claim 11 wherein the sensors comprise magnetic switches activated by proximity to a magnetic field.

13. The system of claim 1 wherein the label is formed separately from the first part and affixed thereto.

14. The system of claim 1 wherein the label is formed directly on the first part.

15. The system of claim 1 wherein the selectively magnetizable portions of the label comprise magnetic ink.

16. The system of claim 1 wherein the label is associated with the first part so as to be obscured from sight.

17. The system of claim 1 wherein the reader is associated with the second part so as to be obscured from sight.

18. A method for verifying in a system having first and second parts that the first part of the system may be properly used with the second part of the system, wherein the first part comprises a label defining a grid having a plurality of discrete portions that are selectively magnetizable to provide a predetermined pattern unique to the first part; and the second part comprises a magnetic reader for identifying the magnetic pattern on the first part and generating a signal indicative of the pattern, and a programmable controller configured to receive signals from the reader to confirm the identity of the first part and further configured to be reprogrammed to identify a changed predetermined pattern; the method comprising:
    establishing an initial predetermined pattern of the plurality of discrete magnetic portions associated with the label by selectively magnetizing discrete portions of the grid and programming the programmable controller to recognize the pattern as authentic;
    periodically changing the predetermined pattern of the plurality of discrete selectively magnetizable portions associated with the label by selectively magnetizing discrete portions of the grid to provide a predetermined pattern different from the initial predetermined pattern;
    reprogramming the programmable controller to recognize the changed pattern as authentic;

bringing the first part into proximity with the second part so that the magnetic reader can read the magnetic portions on the label associated with the first part;

the reader sending a signal to the controller corresponding to the pattern on the label; and the controller determining whether the pattern corresponds to that of an authentic first part and permitting further operation of the system only upon confirmation that the first part is authentic.

19. The method of claim 18 further comprising:

requiring input to the controller by an operator identification of a selected procedure to be performed to confirm the suitability of the first part for performing the selected procedure; and permitting further operation of the system only upon the controller confirming that the first part is capable of performing the selected procedure.

20. The method of claim 18 wherein the first part comprises a single-use disposable fluid processing assembly and the second part comprises a durable reusable centrifuge assembly for performing apheresis.

\* \* \* \* \*